Patented Aug. 24, 1948

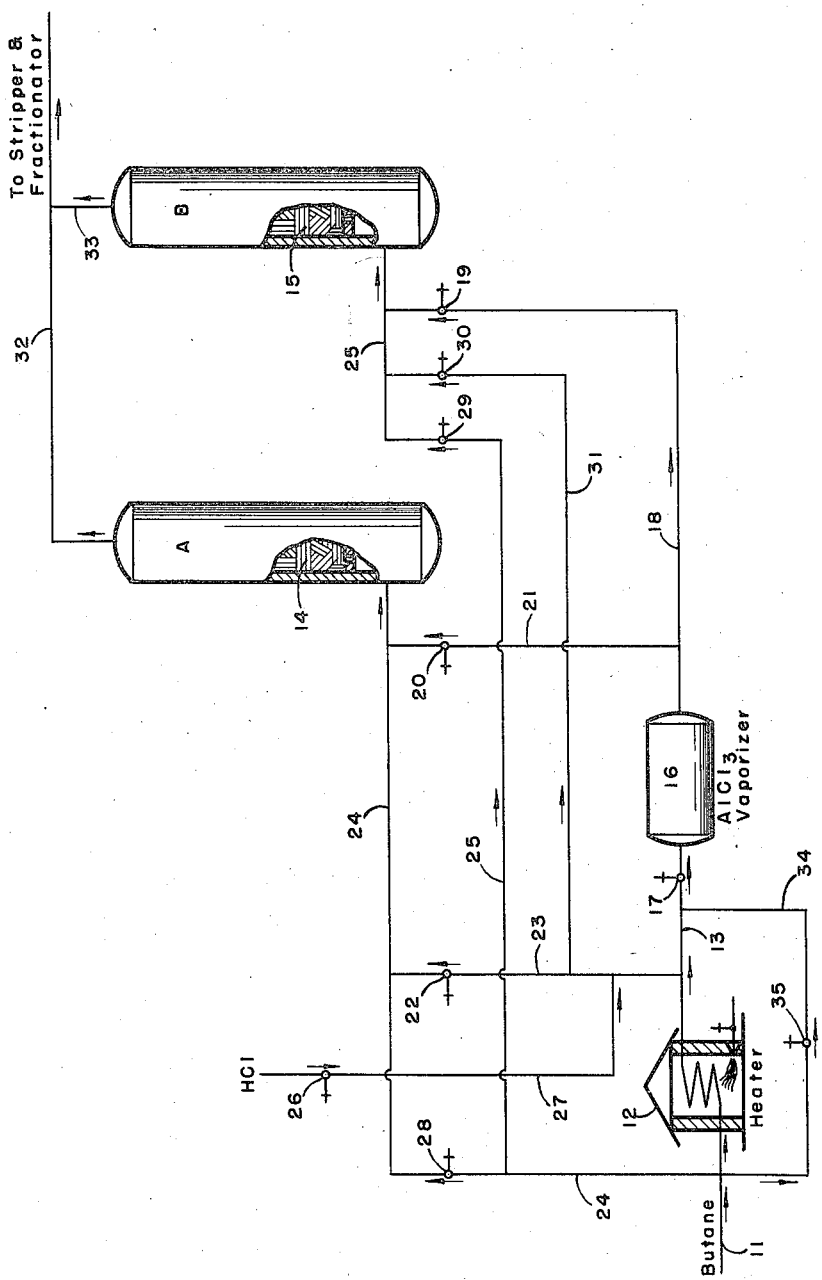

2,447,573

UNITED STATES PATENT OFFICE 2,447,573

PROCESS FOR ISOMERIZING PARAFFINS

Otto Gerbes, Goose Creek, Tex., assignor to Standard Oil Development Company, a corporation of Delaware Application March 13, 1945, Serial No. 582,429

4 Claims. (Cl. 260—683.5)

The present invention is concerned with an isomerization process in which a supported catalyst of the type exemplified by aluminum chloride deposited on Porocel is employed. More particularly, the invention is concerned with a method of operating a plurality of isomerization reactors at maximum efficiency.

In commercial operations, in order to secure maximum production in isomerization of paraffins to isoparaffins, it is customary to employ a plurality of isomerization reactors containing beds of supported catalyst with the hydrocarbon being routed to the reactors in parallel and with the products issuing from the reactors in parallel, the streams combined and the total stream being passed to auxiliary recovery facilities for segregation of products. In these types of operations, it is customary to heat the incoming hydrocarbon stream in a single heater with the heated stream being divided into a number of streams corresponding to the number of isomerization reactors operating in parallel. In starting up this type of operation the catalyst beds are usually all of the same initial activity, but unfortunately one or more beds may be depleted in activity more rapidly than the other beds. This unfortunate circumstance imposes a serious operating problem since it is necessary to reactivate the depleted beds while the remaining beds are on the operating stream.

In co-pending application, U. S. Serial No. 519,306, filed January 22, 1944, for W. B. Franklin, now U. S. Patent No. 2,407,488, it is disclosed and claimed that appreciable advantages accrue from withholding hydrogen halide promoter from an isomerization reaction while the catalyst bed is being reactivated by addition of aluminum halide thereto. This beneficial effect accruing from withholding hydrogen halide promoter to the reactor while aluminum halide is being added thereto imposes an additional problem when a plurality of reactors is employed.

As mentioned before, for some unknown reason isomerization reactors employing catalysts of the type mentioned do not maintain their operating efficiency at the same rate. Consequently, when a given isomerization reactor in a series of isomerization reactors shows evidence of decreasing activity in isomerizing normal paraffins to isoparaffins, it is customary to raise the temperature of the bed by increasing the temperature of the feed to compensate for the loss in activity. At the high temperatures, it is possible to maintain conversion at commercially economical levels. This circumstance also imposes a serious operating problem when a plurality of isomerization reactors is employed.

It is, therefore, the main object of this invention to provide a mode of operation for adjusting the temperature of the freshly activated catalyst bed while maintaining a substantially higher temperature on a remaining reactor bed or beds of a series of parallel beds.

It is also an object of this invention to provide a method of maintaining a substantially lower temperature on a freshly activated bed while another bed is being reactivated by sublimation of aluminum halide thereto.

In accordance with the present invention these desirable objects are obtained by injecting a portion of unheated feed stock into a bed of high activity while routing feed stock at a higher temperature to a bed of low activity and by withholding hydrogen halide promoter from the beds being reactivated while adding hydrogen halide to the bed or beds on the operating stream. An important feature of the present invention is the adjustment of temperature of a freshly activated catalytic bed prior to addition of hydrogen halide promoter gas thereto. This is accomplished preferably by cooling the reactor bed to a temperature between 230° and 270° F. by injection of cold feed stock before allowing any hydrogen halide to be introduced. If hydrogen halide were added before the fresh bed is cooled, cracking reactions may take place with sludging of catalyst and loss in valuable product by decomposition reactions.

The invention will be illustrated further by reference to the drawing in which the single figure represents one embodiment.

Turning now to the drawing, numeral 11 designates a charge line through which a paraffin hydrocarbon, such as normal butane, is fed to heater 12 in which the hyrocarbon is vaporized and heated to a temperature in the range from about 230 to 330° F. In this particular instance it will be assumed that the heated and vaporized hydrocarbon issues from heater 12 by way of line 13 at a temperature of 330° F.

The system comprises two reactors, indicated by letters A and B, each containing a bed of porous adsorbent material, such as Porocel, denoted by the shaded portions 14 and 15. During initial operations a portion of the heated and vaporized hydrocarbon in line 13 is routed to aluminum chloride vaporizer drum 16 by opening valve 17 in line 13. The stream containing aluminum chloride in sublimed form issues from drum 16 by line 18 and passes thereby, by opening valve 19 in line 18 and valve 20 in line 21, to the reactors A and B. At the same time valve 22 in branch line 23 and valve 30 in line 31 are opened routing the remaining portion of heated and vaporized hydrocarbon stream directly to the reactors A and B by lines 24 and 25 respectively. In this manner the beds 14 and 15 are provided with a catalytic amount of aluminum chloride which is deposited on the adsorbent material. Valve 17 in line 13 is then closed, routing the feed hydrocarbon through lines 23, 24, 31, and 25. It may be desirable to close also valves 19 and 20 in lines 18 and 21.

The beds 14 and 15 in reactors A and B will be at a temperature of about 330° F. by virtue of this temperature being employed in heating the hydrocarbon stream during periods when aluminum chloride is sublimed into the reactor. Since the beds 14 and 15 will be at their initial stages of reactivity during these periods, it is necessary to cool these beds prior to the injection of hydrogen chloride by way of line 27. Therefore, both of the reactors A and B are cooled to a temperature of about 230° F. by injection of cool normal butane from line 11. This is performed by opening valve 28 in line 24 and valve 29 in line 25. In this manner the temperature is reduced rapidly preventing cracking of the normal paraffin and sludging of the catalytic beds 14 and 15. If the beds 14 and 15 were not cooled to a temperature in the range between 230° to 270° F. before addition of the hydrogen halide promoter, the initially high activity of the catalytic beds might cause a cracking reaction to occur rather than isomerization.

After the addition of aluminum chloride has been discontinued and the temperatures of the catalyst beds have been reduced as mentioned above, an amount of hydrogen chloride, generally between about 2 and 10 mole percent, based on the hydrocarbon, is added to the vaporized hydrocarbon flowing through line 23, by opening valve 26 in line 27.

For purpose of illustration of the present invention, it is assumed that the catalytic bed 14 has become depleted in activity more rapidly than the bed 15. In this instance valve 22 in line 23 is closed and valve 28 in line 24 is also closed. Valve 17 in line 13 is opened and valve 20 in line 21 is opened, valve 19 in line 18 remaining closed. In this manner a portion of the hydrocarbon feed in line 13 passes through the aluminum chloride vaporizer drum 16 and allows an additional catalytic amount of aluminum chloride to be added to the bed 14. It is preferable to maintain bed 14 at a temperature of approximately 300° F. while the aluminum chloride is caused to be absorbed. In order to maintain desirable temperature conditions for this operation, the mixture of hydrocarbon feed and aluminum chloride vapor removed from vaporizer 16, if above a temperature of 300° F., may be cooled to approximately 300° F. by admixing therewith the proper amount of fresh feed. In the example given, where it is assumed reactor A is to be regenerated, this may be accomplished by adjusting the amount of fresh feed added through line 24 by controlling valve 28. Generally addition of aluminum chloride to the bed 14 will require about 10 or 12 hours for a bed containing about 45,000 to 50,000 pounds of Porocel. After this period of time valve 17 is closed, valve 28 is opened, and valve 22 is throttled allowing the bed 14 to be cooled rapidly to a temperature between 230 and 270° F. Usually about 15% of the fresh feed may be bypassed into reactor A to accomplish the cooling. The required cooling is generally attained after a period of about 2 hours, it being understood, of course, that the initial portion of the bed 14 is cooled nearly immediately with a traveling front of cool fresh feed passing upwardly through the reactor bed 14. After the cooling has been accomplished valve 28 is closed and valve 22 is opened wide as desired putting the reactor A back on the operating stream.

When the reactor B becomes depleted in activity essentially the same procedure is employed. In this instance valve 30 in line 31 is closed, valve 17 in line 13 is opened, and valve 19 is likewise opened allowing aluminum chloride to be deposited onto the bed 15. After the aluminum chloride is added to the bed 15, valve 17 and 19 are closed and valve 29 in line 25 is opened allowing the bed 15 to be cooled similarly to the bed 14 prior to opening completely valve 30 placing the reactor B back on the operating stream.

While it has not been mentioned before, it is understood, of course, that during all these operations product issues from the reactors A and B by lines 32 and 33 and are routed thereby to auxiliary stripping or fractionating facilities for recovery as required.

Under some circumstances the heated, vaporized hydrocarbon issuing from line 13 may be at a higher temperature than require for sublimation of aluminum chloride from drum 16. Line 34 controlled by valve 35 is therefore provided to allow adjustment of temperature in drum 16 by injection of cooler hydrocarbon feed.

The temperature of the individual beds may be adjusted by suitably admixing cold hydrocarbon injected through inlet line 11 and branch line 24 with heated hydrocarbon from furnace 12. In this manner the temperature of every reactor which has just been regenerated may be maintained at the desired temperature of approximately 230° F. while another reactor or reactors which have been on stream for some time may be maintained at a higher temperature somewhere within the desired range of 230° to 330° F. With the arrangement shown catalyst reactors in which uniform conditions are maintained may remain on stream with the conditions held at the desired fixed rate while one of the reactors is being regenerated. That is to say, with a group of reactors it is necessary to regenerate only one reactor while the remaining reactors are being operated under optimum conditions.

It will be apparent to the skilled worker that my mode of operation allows considerable flexibility in the operation of an isomerization system employing a plurality of reactors. The amount of hydrogen chloride consumed and lost from the system is reduced to a minimum in accordance with the present invention. The catalyst beds are maintained at maximum efficiency and at optimum temperatures for maximum production. Considerable flexibility is embodied in my process to allow advantage to be taken of the decrease in activity with age of the catalyst beds. The present invention also allows the beds to be reused at will with a minimum loss in production.

Cooling of the reactors A and B and beds 14 and 15 by injection of cool feed hydrocarbons results in nearly immediate cooling which is very important since otherwise cracking of the hydrocarbon rather than isomerization might take place under the high temperature conditions. The time employed during the cooling operation is important to prevent such decomposition reactions and to prevent migration of the aluminum halide from the beds 14 and 15 since aluminum halide deposited on a porous adsorbent exerts a considerable vapor pressure.

The nature and objects of the present invention having been fully described and illustrated what I wish to claim as new and useful and to secure by Letters Patent is:

1. In an isomerization process, the steps of forming a feed stock consisting essentially of low molecular weight normal paraffinic hydrocarbon, discharging a mixture of isomerizable low molecular weight paraffin feed stock and aluminum chloride vapor free from promoter gas into a porous support at a temperature of approximately 300° F. to cause adsorption of the aluminum chloride on the porous support and form an active catalytic mass, passing feed stock free from promoter gas at atmospheric temperature into the active catalytic mass and cooling said mass to a temperature in the range of 230° to 270° F., supplying a mixture of feed stock and hydrogen chloride to the cooled active catalytic mass to cause isomerization therein at a temperature in the range of 230° to 270° F. and removing isomerized product from the active catalytic mass.

2. In an isomerization process wherein paraffinic hydrocarbon is isomerized by contact with an active catalytic mass formed by the adsorption of aluminum chloride on a porous support, the steps of forming a feed stock consisting essentially of isomerizable low molecular weight normal paraffinic hydrocarbon, bringing the feed stock and hydrogen chloride into contact with the active catalytic mass to cause isomerization at a temperature in the range of 230° to 270° F., removing isomerized product from the active catalytic mass, continuing to supply a mixture of feed stock and hydrogen chloride to the catalytic mass and gradually increasing the temperature of isomerization as the catalytic mass remains in service until a maximum temperature of 330° F. is reached, subsequently regenerating the mass by contacting it with a mixture of feed stock and aluminum chloride vapor free from promoter gas at a temperature of approximately 300° F. to cause adsorption of aluminum chloride on the porous support and form a regenerated catalytic mass, subsequently bringing feed stock at approximately atmospheric temperature and free from promoter gas into contact with the regenerated catalytic mass to cool it rapidly to a temperature in the range of 230° to 270° F. and contacting the cooled regenerated catalytic mass with a mixture of feed stock and hydrogen chloride of a temperature in the range of 230° and 270° F. to cause isomerization of at least a part of the feed stock.

3. In an isomerization process, the steps of forming a feed stock consisting essentially of isomerizable low molecular weight normal paraffinic hydrocarbon, forming a plurality of parallel beds of a porous support, contacting a mixture of feed stock and aluminum chloride vapor free from promoter gas with each of said beds at a temperature of approximately 300° F. to cause adsorption of aluminum chloride on the porous support and form a plurality of active catalytic beds, passing feed stock at approximately atmospheric temperature and free from promoter gas into each of said beds to cool them rapidly to a temperature in the range of 230° to 270° F., subsequently contacting each of said beds with a mixture of feed stock and hydrogen chloride at a temperature in the range of 230° to 270° F. to cause isomerization of at least a part of the feed stock and removing isomerized product from each of said active catalytic beds.

4. In an isomerization process, the steps of forming a plurality of parallel active catalytic beds including a porous support having aluminum chloride deposited thereon with the temperature of the active beds within the range of 230° to 270° F., forming a feed stock consisting essentially of isomerizable low molecular weight normal paraffinic hydrocarbon, admixing with a stream of feed stock a stream of hydrogen chloride and causing the hydrogen chloride to be supplied at a fixed rate thereto, supplying the mixture of feed stock and hydrogen chloride to the active catalytic beds at a temperature within the range of 230° to 270° F. to cause isomerization of at least a portion of the feed stock in each bed, removing isomerized product from each bed, continuing to supply mixture of feed stock and hydrogen chloride to each bed, gradually increasing the temperature of the isomerization reaction in each bed until a temperature of approximately 330° F. is reached in one of said plurality of beds, terminating the supply of mixture of feed stock and hydrogen chloride to the said bed reaching a temperature of 330° F. while continuing to contact hydrogen chloride at said fixed rate and in admixture with feed stock with the remaining beds, regenerating said selected bed by contacting it with a mixture of feed stock and aluminum chloride vapor free from promoter gas and at a temperature of approximately 300° F. to cause adsorption of aluminum chloride on the porous support and form an active catalytic bed, subsequently passing feed stock free from promoter gas and at approximately atmospheric temperature to the selected bed to cool it rapidly to a temperature in the range of 230° to 270° F. and contacting the cooled selected bed with a mixture of feed stock and hydrogen chloride to cause isomerization of at least a portion of the feed stock within the selected bed at a temperature in the range of 230° to 270° F.

OTTO GERBES.

REFERENCES CITED

The following references are of record in the file of this patent:

UNITED STATES PATENTS

| Number | Name | Date |
|---|---|---|
| 2,274,624 | McMillan | Feb. 24, 1942 |
| 2,323,830 | McMillan | July 6, 1943 |
| 2,346,527 | Warrick et al. | Aug. 11, 1944 |
| 2,354,851 | Danforth | Aug. 1, 1944 |
| 2,367,333 | Callaway | Jan. 16, 1945 |
| 2,395,263 | Foster | Feb. 19, 1946 |
| 2,399,883 | Myers | May 7, 1946 |
| 2,403,181 | Jones | July 2, 1946 |
| 2,404,499 | Iverson | July 23, 1946 |